US010401531B2

(12) United States Patent
Bürger et al.

(10) Patent No.: US 10,401,531 B2
(45) Date of Patent: Sep. 3, 2019

(54) IMPLEMENTATION OF EVALUATION AND SEQUENCE CRITERIA IN LIGHT GRID

(71) Applicant: SICK AG, Waldkirch (DE)

(72) Inventors: Jürgen Bürger, Waldkirch (DE); Stefan Kienzler, Waldkirch (DE); Ralf Herrmann, Waldkirch (DE)

(73) Assignee: SICK AG, Waldkirch (DE)

( * ) Notice: Subject to any disclaimer, the term of this patent is extended or adjusted under 35 U.S.C. 154(b) by 190 days.

(21) Appl. No.: 15/446,342

(22) Filed: Mar. 1, 2017

(65) Prior Publication Data

US 2017/0254922 A1 Sep. 7, 2017

(30) Foreign Application Priority Data

Mar. 4, 2016 (EP) .................................... 16158736

(51) Int. Cl.
*G01V 8/20* (2006.01)
*F16P 3/14* (2006.01)

(52) U.S. Cl.
CPC . *G01V 8/20* (2013.01); *F16P 3/14* (2013.01)

(58) Field of Classification Search
CPC .... G01V 8/20; G01V 8/10; G01V 8/00; F16P 3/14; F16P 3/144
See application file for complete search history.

(56) References Cited

FOREIGN PATENT DOCUMENTS

| | | | | |
|---|---|---|---|---|
| DE | 29500873.3 U1 | 4/1995 | | |
| DE | 4424537 A1 * | 1/1996 | ............. | F16P 3/144 |
| DE | 10329881 A1 | 1/2005 | | |
| DE | 202007014653 U1 | 4/2009 | | |
| DE | 102008004941 A1 | 8/2009 | | |
| DE | 10201894 B4 | 3/2010 | | |

OTHER PUBLICATIONS

European Search Report dated Aug. 29, 2016 in corresponding European Application No. 16158736.5.

* cited by examiner

*Primary Examiner* — Que Tan Le
*Assistant Examiner* — Jennifer D Bennett
(74) *Attorney, Agent, or Firm* — Nath, Goldberg & Meyer; Jerald L. Meyer; Stanley N. Protigal

(57) ABSTRACT

A light grid and a method using a light grid include a transmission unit having a plurality of light transmitters for transmitting light beams and a reception unit having a plurality of light receivers for receiving the light beams of the light transmitters. The transmission unit and the reception unit are spaced apart from one another and are disposed opposite one another. A monitored field is formed by oppositely disposed light transmitters and light receivers for detecting objects. The light transmitters are activated one after the other in cycles and the light receivers are evaluated in these cycles. A programmable evaluation unit is provided for evaluating the received signals of the light receivers of a cycle with reference to predefined beam evaluation criteria and forming an intermediate result therefrom. The evaluation unit evaluates at least one intermediate result of a cycle with reference to at least one predefined sequential criterion.

6 Claims, 9 Drawing Sheets

1 7 2 3 3 3 6 6 6 4 5 12 19 9 18 4 14 18 17

1
7
2
3
3
3
6
6
6
4
5
19
12
9
18
4
14
18
17

Fig.2
Fig.2 A
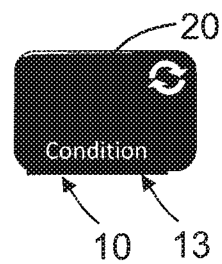
Fig.2B
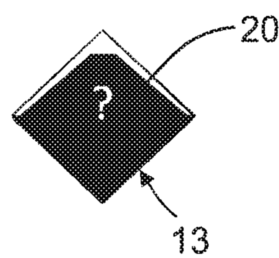
Fig.2C
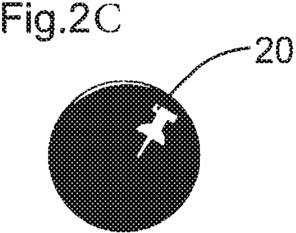
Fig.2D
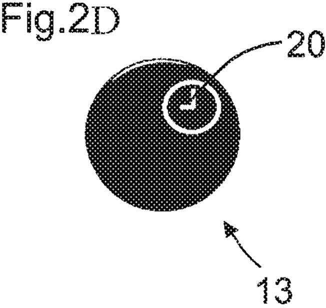
Fig.2 E
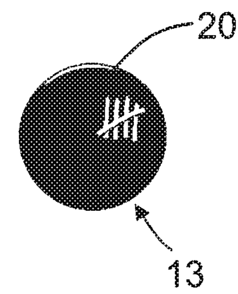
Fig.2 F
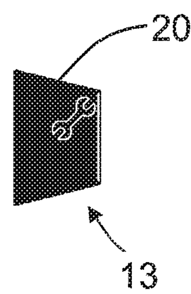
Fig.2G
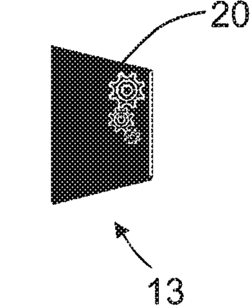
Fig.2H
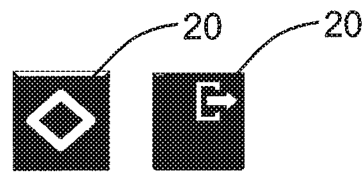

21
20
20.1
NBB == 0
FBM<=5
Counter1++
FBM>=5
AX
NBB != 0
Counter1 < 2
AND
NBB != 0
20
?
NCBB <= 10
Y
Marker2 =
drawbar
recognized
N
AY
NBB != 0
20

IMPLEMENTATION OF EVALUATION AND SEQUENCE CRITERIA IN LIGHT GRID

FIELD

The present invention relates to a light grid and to a method using a light grid.

BACKGROUND

Light grids or automation light grids are used as measuring systems for determining object heights and/or object widths. Light grids or automation light grids are furthermore used for the detection of objects in a monitored zone.

An interruption of a light beam in the monitored zone is evaluated in these applications.

If now a more complex evaluation of the monitored area, this means of a two-dimensional region, becomes necessary, then this indicates an evaluation taking place remote from the light grid.

In these cases, the light grid permanently provides information on the individual light barriers and/or light axes having the light beams to an external evaluation unit, for example a PC or a unit similar to a PC, which so-to-say continuously stitches the individual sectional frames in the monitored zone of the light grid to form an image and evaluates them.

Depending on the sampling rate and the number of beams, a large amount of data has to be transmitted to the external evaluation unit and the external evaluation unit has to be configured as very powerful in order to be able to evaluate the constantly accumulating data. A high demand in effort and cost thereby arises with regard to the external evaluation unit.

Furthermore, a data interface of the light grid also has to be configured as powerful in order to provide a large amount of data to the external evaluation unit.

DE 102 01 894 B4 discloses a light grid having additional inputs and an integrated freely programmable logic unit.

DE 103 29 881 A1 discloses a light grid for contour measurement, wherein reference values are stored in the light grid. The reference values are, for example, taught by means of a teaching in at distinctive points.

SUMMARY

An object of the invention is to provide a light grid, wherein a simple and inexpensive evaluation unit should be arranged directly in the light grid and output signals, in particular switching output signals, should be provided directly to a machine control or to a programmable logic controller.

The object is satisfied in accordance with claim 1 by a light grid comprising a transmission unit having a plurality of light transmitters for transmitting light beams and a reception unit having a plurality of light receivers for receiving the light beams, wherein the transmission unit and the reception unit are spaced apart from one another and are disposed opposite one another; wherein a monitored field is formed by oppositely disposed light transmitters and light receivers for detecting objects; wherein the light transmitters can be activated one after the other in cycles and the light receivers can be evaluated in these cycles; wherein a programmable evaluation unit is provided in the reception unit, with the evaluation unit being configured to evaluate received signals of the light receivers of a cycle with reference to predefined beam evaluation criteria and to form an intermediate result therefrom, wherein the intermediate result can be stored in a memory; and the evaluation unit is configured to evaluate at least one intermediate result of a cycle with reference to at least one predefined sequential criterion; and the evaluation unit is configured to output at least one output signal at least one output on the basis of the evaluated intermediate result.

The object is further satisfied by a method using a light grid comprising a transmission unit having a plurality of light transmitters for transmitting light beams and a reception unit having a plurality of light receivers for receiving the light beams of the light transmitters, wherein the transmission unit and the reception unit are spaced apart from one another and are disposed opposite one another; wherein a monitored field is formed by oppositely disposed light transmitters and light receivers for detecting objects; wherein the light transmitters are activated one after the other in cycles and the light receivers are evaluated in these cycles; wherein a programmable evaluation unit is provided in the reception unit, with the evaluation unit evaluating the received signals of the light receivers of a cycle with reference to predefined beam evaluation criteria and forming an intermediate result therefrom, wherein the intermediate result is stored in a memory; and the evaluation unit evaluates at least one intermediate result of a cycle with reference to at least one predefined sequential criterion; and the evaluation unit outputs at least one output signal at least one output on the basis of the evaluated intermediate result.

The invention starts from the basic idea that no plurality of complete samplings of the light grid or of sections or cycles along the object and all of their data has to be evaluated.

In accordance with the invention, only distinctive sections or cycles are analyzed and a decision is derived therefrom.

Neither a storage demanding in effort and cost nor a computing power of the evaluation unit demanding in effort and cost is required for this purpose.

In accordance with the invention, it is possible to carry out a classification of the information from received light beams during a cycle with reference to important feature sequences. The evaluation unit is namely configured to evaluate received signals of the light receivers of a cycle with reference to predefined beam evaluation criteria.

The information from received beams can be discarded again after an evaluation using beam evaluation criteria of the evaluation unit. Information from receiving beams which do not allow an evaluation by beam evaluation criteria, as they do not correspond to any predetermined criteria, can also be discarded such that this information does not have to be stored, whereby no storage space is required.

Only at least one intermediate result, in particular two intermediate results or in particular more than two intermediate results, need to be stored or buffered. Only small amounts of information thereby need to be stored in accordance with the invention, whereby the electronic memory can be configured much smaller.

The evaluation unit is configured to evaluate at least one intermediate result of a respective cycle with reference to at least one respective predefined sequential criterion. The intermediate result or the evaluation result is buffered and kept available for further processing in the evaluation unit. A plurality of different intermediate results or evaluation results can in this respect also be buffered in the evaluation unit.

The evaluation unit is furthermore configured to output an output signal on the basis of the evaluated intermediate result. The output signal controls a following machine or an actor of a machine arranged downstream. The output signal can in this respect be a binary output signal, for example a switching signal. The output signal can furthermore also be a plurality of data or a continuous data stream. The output signal is, for example, output via a bus system.

In accordance with the invention, the information from the cycles is evaluated directly in the evaluation unit of the light grid and only the intermediate results obtained therefrom are stored. The amount of information is thereby significantly reduced, whereby only a fraction of the information needs to be stored.

In accordance with the invention, objects which enter into the monitored field and which are detected by the light grid are analyzed per cycle with reference to distinctive sections, namely with reference to the beam evaluation criteria, and a decision is derived therefrom. The cycles or sections which are no longer relevant or the sections and cycles which lie in the past can be discarded.

The invention is used when a decision on the object detection or object classification should no longer take place on the basis of a single light section or cycle, but rather on the basis of a plurality of light sections or cycles.

As a further condition, the evaluation has to be able to be reduced to some or a few features in order to be able to derive a decision directly therefrom. For example, a vehicle body can be reduced to a few features, whereby the vehicle bodies can, for example, be divided into four vehicle classes. In accordance with the invention, the light grid having the evaluation unit can output signals which, for example, indicate four different vehicle classes. Processing procedures can be set by a subsequent machine on the basis of these output signals.

The interface for the evaluation unit can be configured simply, since no large amounts of data have to be transmitted. The technical demands on the interface are thereby rather small.

In accordance with the invention, a control function is implemented or partly implemented by the light grid itself and no longer has to be implemented completely by a subsequent programmable logic controller.

In accordance with the invention, an amount of data transmitted to a subsequent programmable logic controller is thus reduced.

The light grid in accordance with the invention is versatile in use, since it can be programmed flexibly and can thereby be adapted to the most varied applications.

The light grid can be programmed simply and directly by the user without special programming knowledge being required, since the programming can be carried out in a simple graphical manner using predefined program parts.

In accordance with the invention, the know-how with respect to the light grid program remains with the user. As the user can produce the program himself, the user does not need to communicate or reveal his application know-how or his application knowledge to the light grid manufacturer.

In accordance with the invention, each light grid can be programmed individually. Special devices thereby do not have to be provided. The production of the light grids is thereby simpler, since only light grids having different lengths and a different number of beams have to be provided.

In a further embodiment of the invention, the evaluation unit can be programmed via a personal computer and a graphical programming software. The beam evaluation criteria can be predefined by the graphical programming software and transmitted to the evaluation unit. The beam evaluation criteria are already predefined in the programming software and only need to be selected by the user and combined into a program.

The sequential criteria are furthermore input with the aid of the programming software and are linked with the beam evaluation criteria into a program.

One makes use of modified conditional queries in the programming. The program works schematically as follows using the steps:

- evaluating the cycle with reference to predefined beam evaluation criteria;
- forming and storing an intermediate result;
- evaluating at least one intermediate result with reference to a sequential criterion;
- outputting an output signal on the basis of the evaluation; and
- returning to the first step.

It is thereby possible to satisfy a plurality of applications simply and directly in the light grid using the programmable light grid in accordance with the invention.

In a further embodiment of the invention, the beam evaluation criteria are predefined and at least one of the following beam evaluation criteria can be set:

- a predetermined, fixed light beam is interrupted;
- a predetermined, fixed light beam is not interrupted, but free;
- a central light beam is interrupted;
- a central light beam is not interrupted, but free;
- a first light beam is interrupted;
- a first light beam is not interrupted, but free;
- a continuous and associated number of light beams is interrupted;
- a continuous and associated number of light beams is not interrupted, but free;
- a last light beam is interrupted;
- a last light beam is not interrupted, but free;
- a predetermined, fixed number of light beams is interrupted;
- a predetermined, fixed number of light beams is not interrupted, but free.

However, arbitrary beam patterns can also be predefined. Tolerances can optionally be set with the beam evaluation criteria or tolerances are optionally taken into account in the evaluation of the beam evaluation criteria.

In accordance with this further embodiment, the received signals of the light receivers can be limited to a few features. The beam evaluation criteria represent conditions by which the signals of the light receivers are evaluated, within a cycle.

The beam evaluation criteria are already predefined as modules in the programming software and can be selected simply, and optionally also be modified, by the user. The beam evaluation criteria are, for example, referred to as a condition and can be selected graphically from a toolbox.

For example, in accordance with a specific module, a predetermined, fixed light beam has to be interrupted. One of the light beams of the light grid which should be interrupted can be fixed in the module. The module can thereby be adapted to a specific application.

It can be fixed in a further module that a predetermined, fixed light beam is not interrupted, but free. One of the light beams of the light grid which should not be interrupted can also be fixed in this module.

The further named modules are equally predefined and can also be modified by the user and can also be stored as modified in the programming software. The user can thereby compile a separate set of own modules for beam evaluation criteria, whereby a programming becomes more efficient.

In a further embodiment of the invention, the sequential criteria are predefined and at least one of the following sequential criteria can be set:

- waiting until a set beam evaluation criterion is satisfied;
- branching when a set beam evaluation criterion is satisfied;
- recording time until a set beam evaluation criterion is satisfied;
- recording a count;
- deleting an intermediate result marker;
- storing an intermediate result marker;
- logical OR link of intermediate results;
- logical AND link of intermediate results;
- inverting intermediate results;
- changing a function, setting or configuration of the light grid;
- reading in an input value of an input.

The sequential criteria are also provided as predefined modules in the programming software. These modules can also be modified by the user and can be stored in the programming software. The user can thereby compile a separate set of own modules for sequential criteria, whereby a programming becomes more efficient.

A module of the sequential criteria, for example, waits until a set beam evaluation criterion is satisfied. Individual objects can thereby, for example, be selected from a plurality of objects and can be displayed by an output signal. A specific contour can be sampled by a plurality of these modules, whereby a specific contour position can be examined by each individual module. It is thereby possible, for example, to examine a complex contour using a few modules in the program. The module is, for example, referred to as a waiting time module.

A further module results in a branching when a set beam evaluation criterion is satisfied. Different output signals can thereby be output for different objects. The module is, for example, referred to as a branching module.

A further module records the time until a set beam evaluation criterion is satisfied. The module is, for example, referred to as a time recording module. Objects can thus so-to-say be measured, since the time or the path from one event up to the next event is recorded.

A further module records a count. A count can, for example, be recorded until a set beam evaluation criterion is satisfied. However, provision can also be made to start a counter module as soon as a set beam evaluation criterion is satisfied. Object features or objects can be counted off by this function. For example, respective objects of the same kind can be counted and determined separately in an application in which different objects pass the light grid.

A further module is configured to delete an intermediate result marker. An intermediate result marker can thereby be deleted in a memory on the basis of an event.

A further module is configured to store an intermediate result marker. Intermediate results can thereby be called during the program and can be taken into account for further processing in the program.

Further modules respectively provide a logical OR link of intermediate results or a logical AND link of intermediate results. A further module allows an inversion of intermediate results. A logic can be freely programmed by these three modules. A combined module formed from an AND module and an inversion module can in this respect naturally also be provided, namely a so-called NAND module or also a NOR module comprising an OR module and a subsequent inversion module. An arbitrary logic can also be set by NAND modules or NOR modules.

Further modules, for example, change a function, setting or configuration of the light grid.

The light grid can furthermore have at least one input. At least one input value of the input is read in and evaluated in this respect. The input can be an analog input. However, a digital input is preferred. External sensors can, for example, be connected to the input or machine signals of a machine control or of a programmable logic controller can be connected.

In a further embodiment of the invention, the function of the light grid, setting or configuration of the light grid is at least one switching threshold, an input configuration, an output configuration, transmission power, reception sensitivity, and/or cycle time.

A module of the sequential criteria, for example, carries out a function, setting and/or configuration of the light grid until a specific beam evaluation criterion is satisfied. A function is, for example, carried out by the light grid, wherein the transmitted beams are operated at a high transmission power or at a low transmission power. Provision can, however, also be made to operate the light grid with the function of a high reception sensitivity or of a low reception sensitivity.

The activation in time or the performance in time of the set function, setting and/or configuration can also, for example, only take place by a connection to further modules of the sequential criteria. For example, by the module 'Wait until a set beam evaluation criterion is satisfied' or the module 'Wait until an input is set'. A function, setting and/or configuration is, for example, set once a plurality of sequential criteria are satisfied one after the other or in parallel.

Furthermore, a cycle time of the light grid can, for example, be changed. In this respect, the cycle time is, for example, reduced or increased. A reduced cycle time is, for example, sensible when an object speed is increased by the monitored field.

The modules of the beam evaluation criteria and the modules of the sequential criteria are linked to one another to form a program. Since the modules are specifically predefined for the light grid evaluation and only need to be modified to a small degree, very complex applications can also be satisfied simply by the user.

BRIEF DESCRIPTION OF THE DRAWINGS

The invention will also be explained in the following with respect to further advantages and features with reference to the enclosed drawing and to embodiments. The Figures of the drawing show in:

FIGS. 2A to 2H different modules for programming;

DETAILED DESCRIPTION

Figure 1:
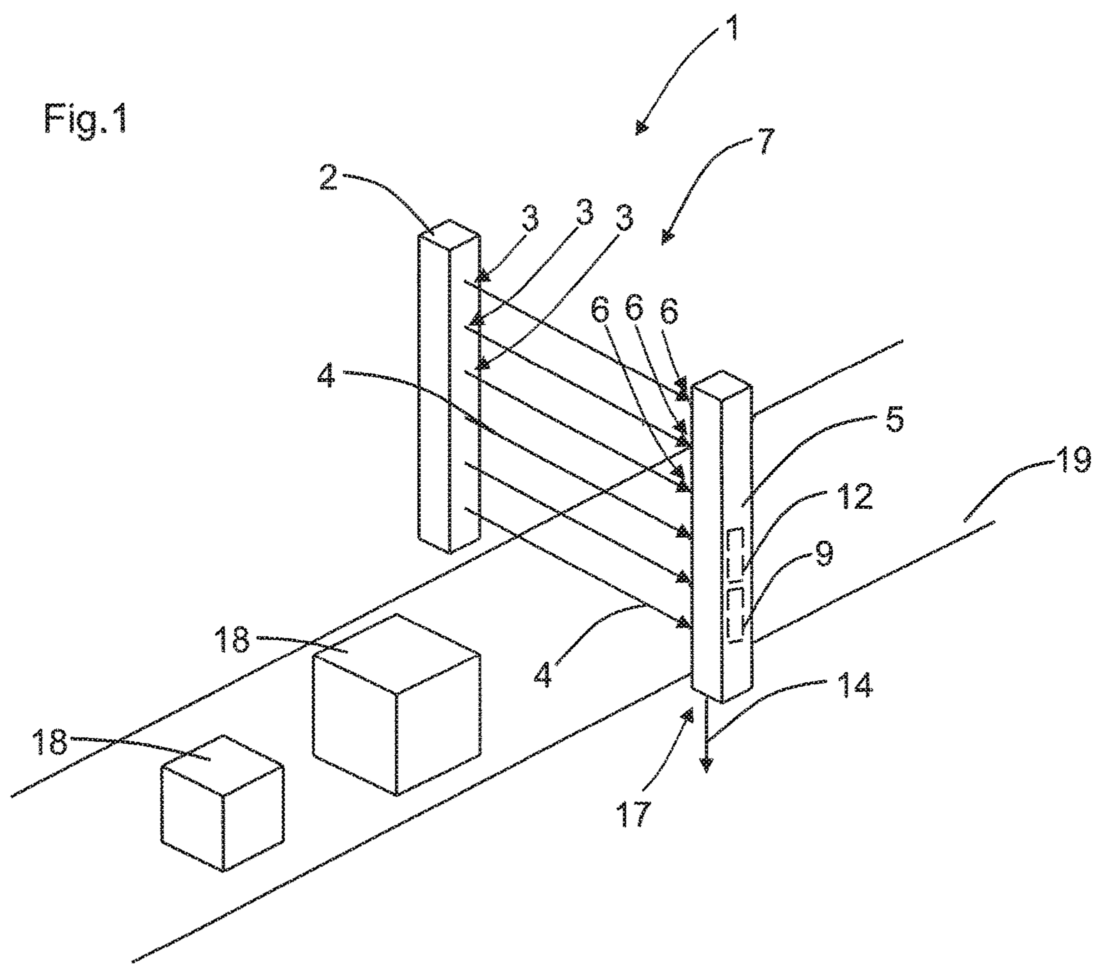
FIG. 1 a light grid for examining objects.

In the following Figures, identical parts are provided with identical reference numerals.

FIG. 1 shows a light grid comprising a transmission unit 2 having a plurality of light transmitters 3 for transmitting light beams 4 and a reception unit 5 having a plurality of light receivers 6 for receiving the light beams 4, wherein the transmission unit 2 and the reception unit 5 are spaced apart from one another and are disposed opposite one another; wherein a monitored field 7 is formed by oppositely disposed light transmitters 3 and light receivers 6 for detecting objects 18; wherein the light transmitters 3 can be activated one after the other in cycles and the light receivers 6 can be evaluated in these cycles; wherein a programmable evaluation unit 9 is provided in the reception unit 5, with the evaluation unit 9 being configured to evaluate received signals of the light receivers 6 of a cycle with reference to predefined beam evaluation criteria 10 and to form an intermediate result therefrom, wherein the intermediate result can be stored in a memory 12; and the evaluation unit 9 is configured to evaluate at least one intermediate result of a respective cycle with reference to at least one respective predefined sequential criterion 13; and the evaluation unit 9 is configured to output at least one output signal 14 at least one output 17 on the basis of the evaluated intermediate result. The objects are transported through the monitored field 7 of the light grid on a conveyor belt 19.

FIG. 2 shows different modules 20 or graphical modules 20 for beam evaluation criteria and sequential criteria.

FIG. 2A shows a module 20 with a sequential criterion 13 or with a beam evaluation criterion 10. For example, the program waits until a specific condition, for example a beam evaluation criterion 10, is satisfied. However, a function and/or a performance of a setting of the light grid can also be carried out until a specific beam evaluation criterion is satisfied.

FIG. 2B shows a module 20 with a sequential criterion 13. A different branching is, for example, taken when a condition is satisfied or not.

FIG. 2C shows a module 20 as an intermediate result marker. An uninterrupted number of beams can, for example, be buffered here.

FIG. 2D shows a time module 20 as a sequential criterion 13. The time of a specific beam interruption is, for example, measured.

FIG. 2E shows a counter module 20 as a sequential criterion 13. Beam interruption events are counted, for example.

FIG. 2F, for example, shows a setting module or configuration module 20. A setting or a configuration of the light grid is, for example, set or changed.

FIG. 2G shows a logical module 20 as a sequential criterion 13. It can, for example, be an AND link module, an OR link module, a NOR link module, a NAND link module or, for example, an inversion module.

FIG. 2H shows modules 20 which, for example, represent an input module or an output module.

Figure 3:
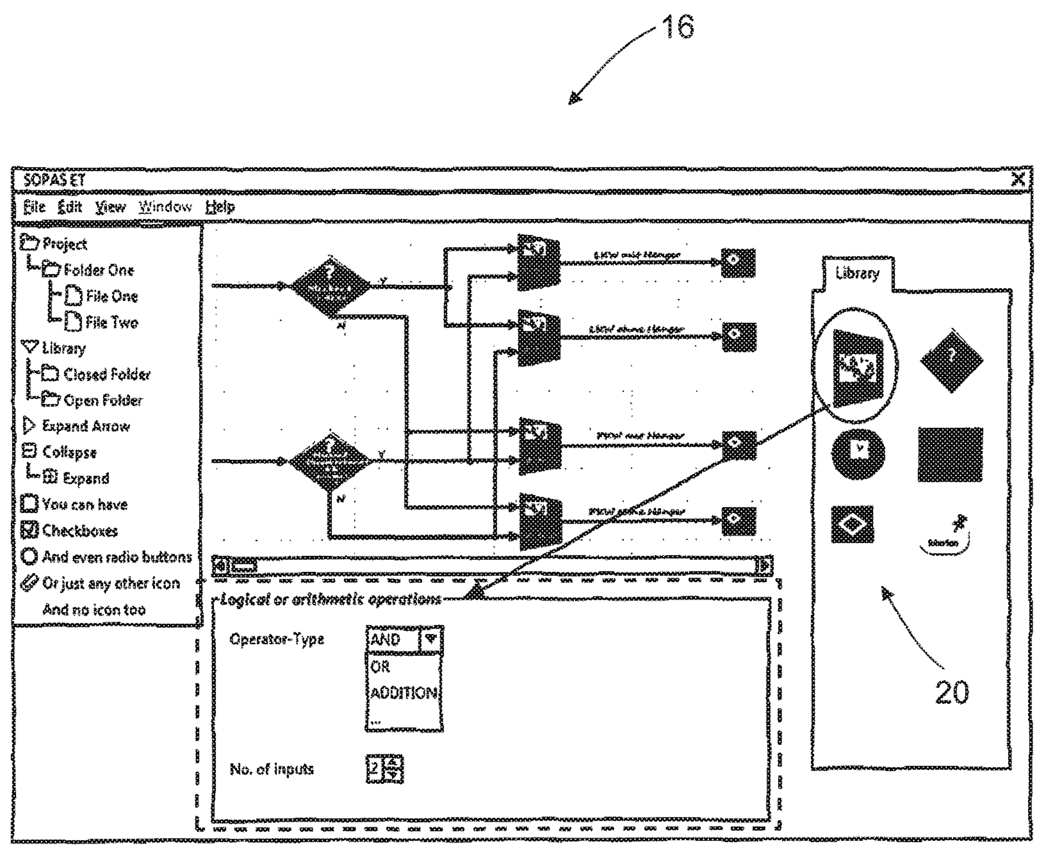
FIG. 3 a graphical programming software.

FIG. 3 shows a graphical programming interface or a graphical programming software 16 with different regions. Options for opening, editing and displaying programs are provided in the second row.

Projects with programs are shown in the left region. Different libraries are shown below it. The graphical program is displayed in the middle upper field. This region is optionally also referred to as the design space. An editing window is provided below it in order to edit individual modules 20 such as modules 20 for beam evaluation criteria or modules 20 for sequential criteria. This region is optionally also referred to as the context menu. The modules 20 can be selected from a library which is displayed in the right region. This region is optionally also referred to as the toolbox. The modules 20 can subsequently be pulled into the editing window or into the program window by drag and drop, this means by a simple pulling with the mouse. The connections between the modules 20 are taken from a library in a similar manner to the modules 20 and are added to the program simply in a graphical manner using the mouse and/or keyboard. In accordance with FIG. 3, a logical AND module is shown as a sequential criterion in the editing window.

Figure 4:
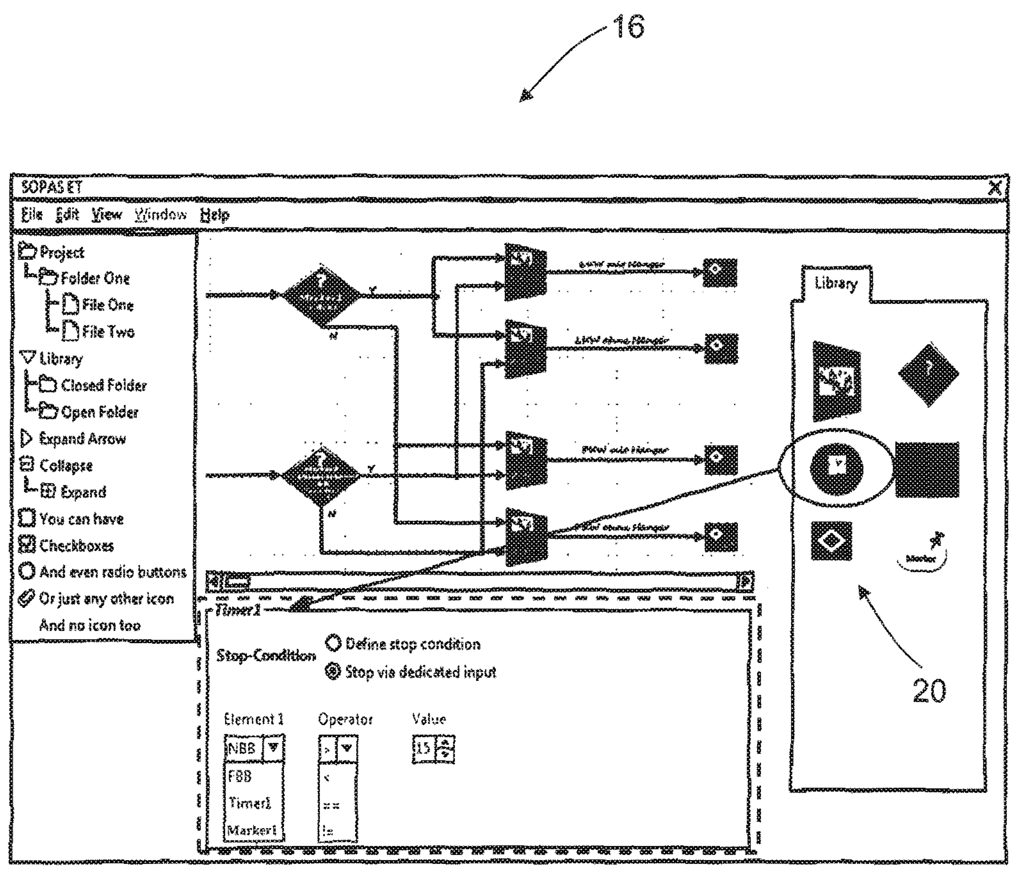
FIG. 4 a graphical programming software.

FIG. 4 shows a graphical programming interface or programming software 16 with a time module 20 as a sequential criterion in the editing window.

Figure 5:
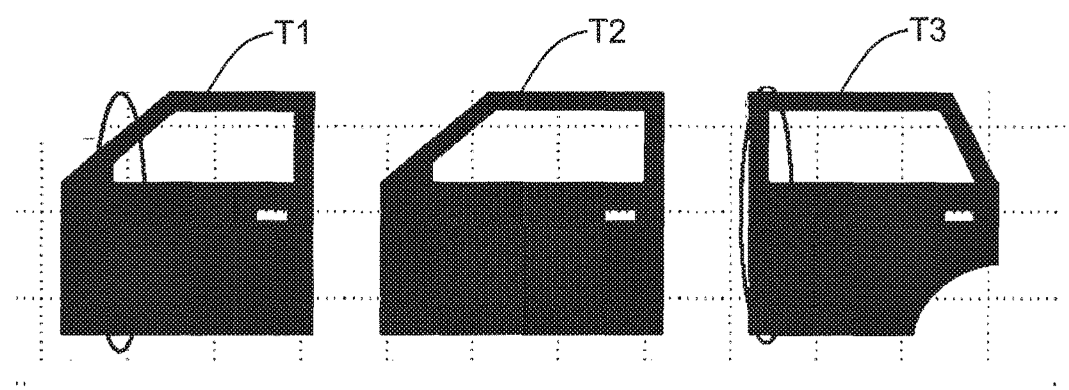
FIG. 5 three doors which are checked.

FIG. 5 shows a further application with three different doors T1, T2 and T3. The doors T1, T2 and T3 are sampled one after the other by the light grid in accordance with the invention. For example, three variants of a vehicle door of the same model should be distinguished at an overhead conveyor. Provision can naturally also be made to distinguish doors of different models. The light grid, for example, has three outputs to output respective output signals.

The doors T1 and T2 can be distinguished on the basis of their lengths. The door T3 can, for example, be distinguished from the doors T1 and T2 on the basis of the window shape.

Figure 6:
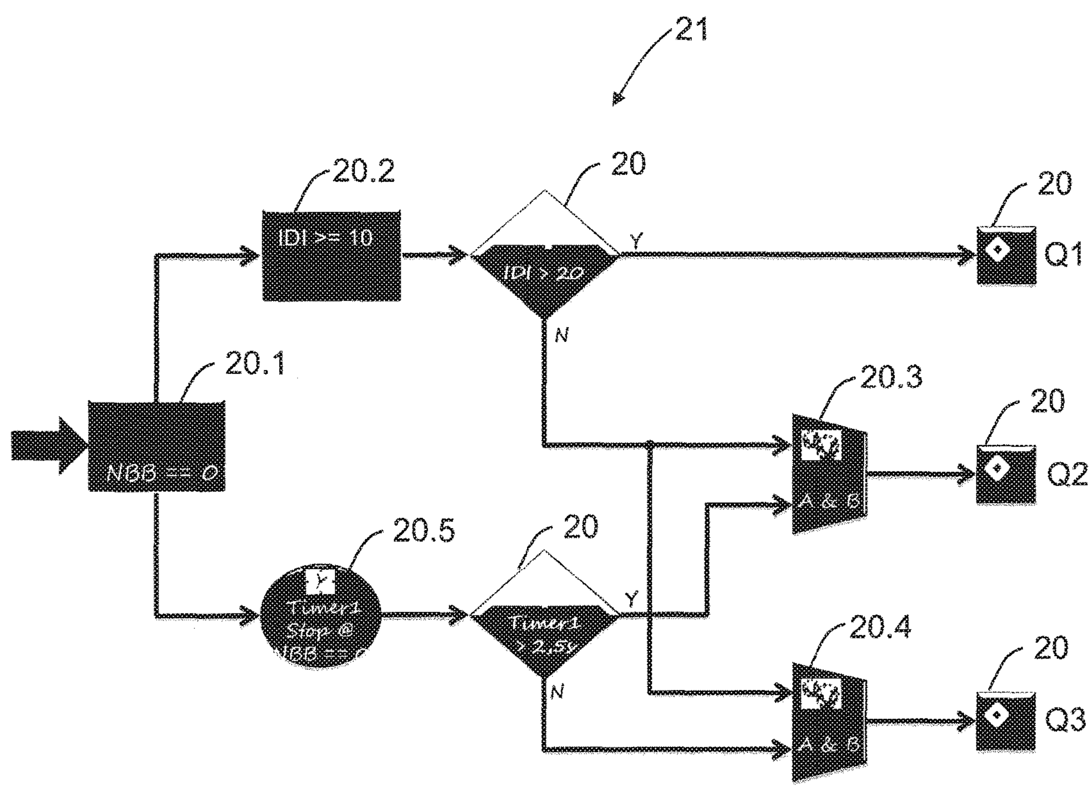
FIG. 6 a program for checking the doors.

FIG. 6 shows the associated program 21 for the application from FIG. 5. In a first step, a check is made by a module 20.1 for beam evaluation as to whether a light beam has been interrupted. The entry of the doors into the light grid is thus checked. The program then branches into two program paths. In the upper path, a check is now made by a module 20.2. as to whether the height of the window is larger than ten light beams at the start. This is the case for all three doors. In a next branching, a check is made whether the inner window has a height of larger than twenty light beams at the start. This condition is only satisfied with door T3. An output signal is therefore set at the output Q1 in order to indicate that the door T3 has been detected. If a door T1 or a door T2 has been detected in this step, a branching to a respective AND module 20.3 or 20.4 is provided.

The length of the doors is measured in the lower path. For this purpose, the time is measured in the module 20.5 until the light path is free again. The time is subsequently checked by a comparator module and the program branches to the AND member 20.3 for the detection of the door T2 or to the AND member 20.4 for the detection of the door T3 depending on the result. If the time of the timer module 20.5 is, for example, greater than 2.5 seconds, it is the door T2. If the time is smaller than 2.5 seconds, it is the door T1. An output signal is output at the output Q2 on the detection of the door T2 and a signal is output at the output Q3 on the detection of the door T3.

Figure 7:
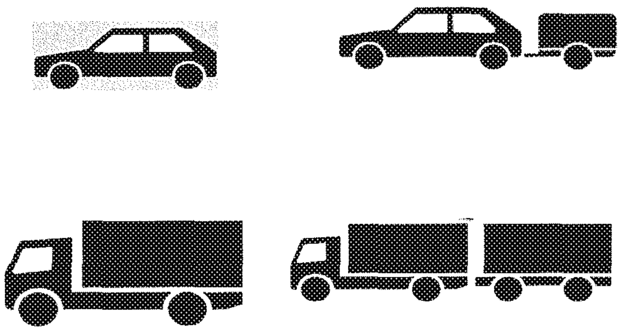
FIG. 7 four vehicles, representative of different vehicle classes.

FIG. 7 shows a further application with four different vehicle classes which should be distinguished with reference to characteristic features. The vehicle classes are in turn detected by a light grid, not shown.

In the upper row, a passenger vehicle is shown at the left-hand side and a passenger vehicle with a trailer is shown at the right-hand side. In the lower row, a heavy goods vehicle is shown at the left-hand side and a heavy goods vehicle with a trailer is shown at the right-hand side. Passenger vehicles and heavy goods vehicles can easily be distinguished from one another by the different heights. The present trailers can be detected in the passenger car and in the heavy goods vehicle in that a drawbar of the trailer is present in each case.

Figure 8:
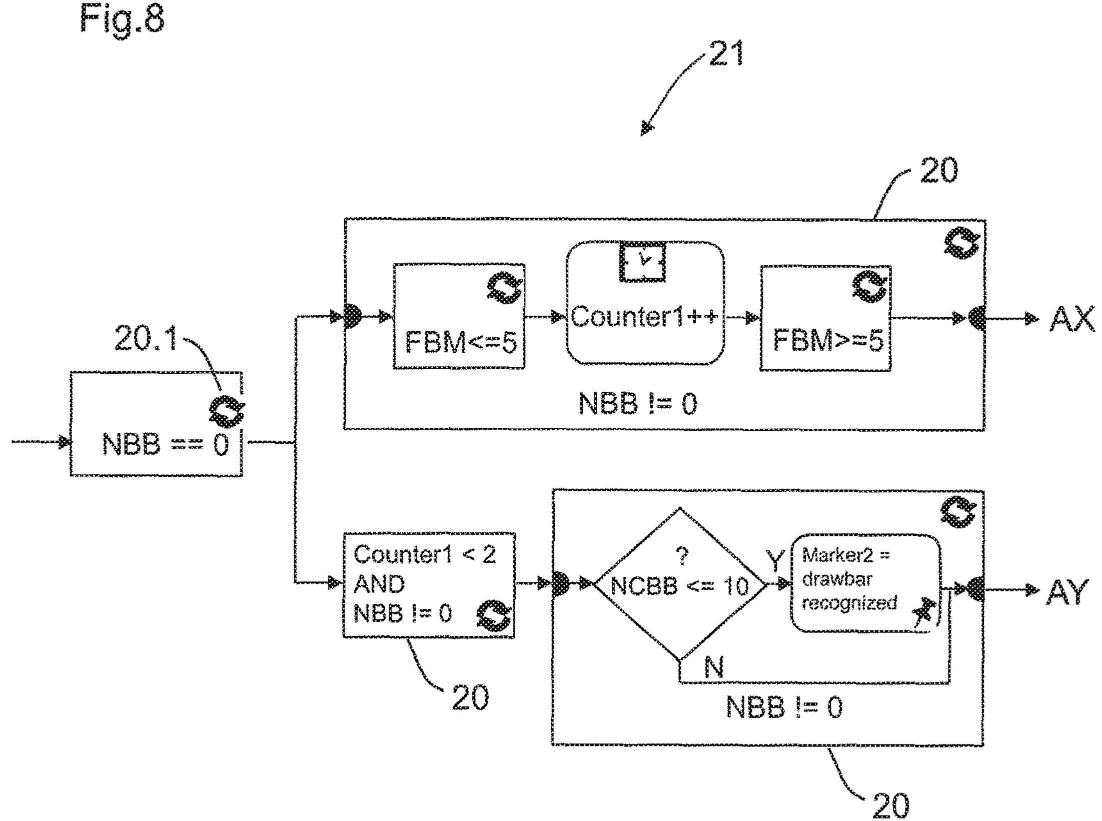
FIG. 8 a program for checking vehicle classes.
Figure 9:
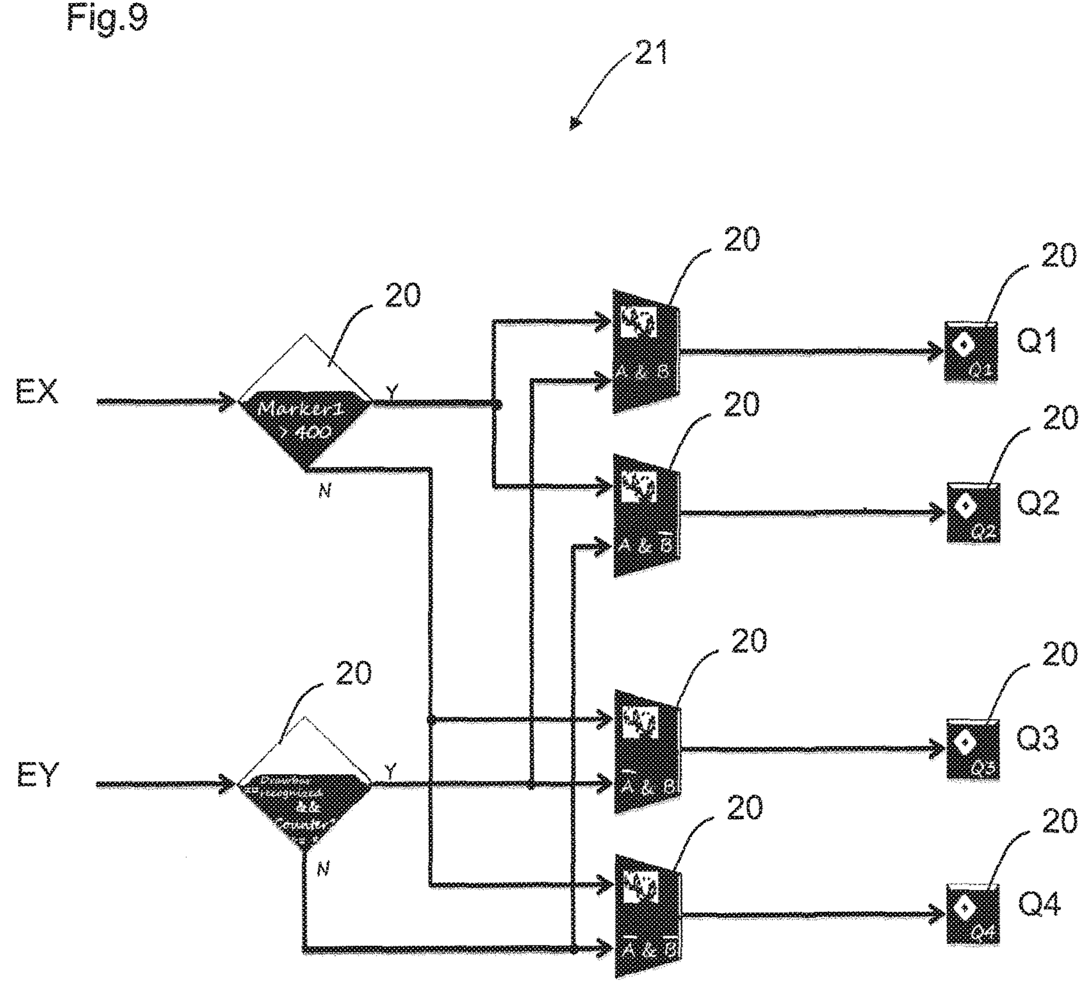
FIG. 9 a program for checking vehicle classes.

FIG. 8 and FIG. 9 show a graphical program 21 for the application from FIG. 7. In a first module 20.1 in accordance with FIG. 8, a check is made whether a beam interruption is present.

The height of the vehicles is checked in the upper path. If the height is larger than a specific value, the output AX is activated in order to indicate that it is a heavy goods vehicle.

A check is made in the lower path whether a drawbar is present. If a drawbar is present, the output AY is activated.

FIG. 9 shows the further part of the graphical program. The outputs AX and AY from FIG. 8 are guided to the inputs EX and EY in accordance with FIG. 9. In FIG. 9, the logical signals are logically linked to the inputs EX and EY in order to output an output signal at the outputs Q1 to Q4. An output signal is output at the output Q1 when a heavy goods vehicle with a trailer has been detected. An output signal is output at the output Q2 when a heavy goods vehicle without a trailer has been detected. An output signal is output at the output Q3 when a passenger vehicle with a trailer has been detected. An output signal is output at the output Q4 when a passenger vehicle without a trailer has been detected.

REFERENCE NUMERALS

1 light grid
2 transmission unit
3 light transmitter
4 light beams
5 reception unit
6 light receiver
7 monitored field
9 programmable evaluation unit
10 beam evaluation criteria
12 memory
13 sequential criterion
14 output signal
16 graphical programming software
17 output
18 object
19 conveyor belt
20 module
21 program
T1, T2, T3 doors
AX output
AY output
EX input
EY input

The invention claimed is:

1. A light grid comprising a transmission unit having a plurality of light transmitters for emitting light beams;

a receiving unit having a plurality of light receivers for receiving the light beams, the transmitting unit and the receiving unit facing one another and are disposed opposite one another, forming a monitored field for detecting objects established by opposing light transmitters and light receivers; wherein the light transmitters can be activated one after the other in cycles and the light receivers can be evaluated in these cycles;

a programmable evaluation unit provided in the receiving unit, the evaluation unit configured to evaluate received signals of the light receivers of a cycle with reference to predetermined beam evaluation criteria and to form an intermediate result therefrom, wherein the intermediate result storable in a memory;

wherein non-relevant information of received signals is discarded after evaluation with the beam evaluation criteria of the evaluation unit and information of received signals which do not allow evaluation by beam evaluation criteria because they do not correspond to the predetermined beam evaluation criteria, eliminating a need for storage space, and discarding the information of received signals which do not allow evaluation by beam evaluation criteria after evaluation with the beam evaluation criteria of the evaluation unit, wherein and the evaluation unit evaluates at least one intermediate result of a respective cycle with reference to at least one respective predefined sequential criterion and wherein the evaluation unit is also configured to output at least one output signal at least one output on the basis of the evaluated intermediate result;

the beam evaluation criteria being predefined and at least one of the following beam evaluation criteria being adjustable:

a predetermined fixed light beam is interrupted, a predetermined fixed light beam is not interrupted but free, a central light beam is interrupted, a central light beam is not interrupted, but free, a first light beam is interrupted, a first light beam is not interrupted, but free, a continuously connected number of light beams is interrupted, a continuously connected number of light beams is not interrupted, but free, one last light beam is interrupted, one last light beam is not interrupted, but free, a predetermined fixed number of light beams is interrupted, a predetermined fixed number of light beams is not interrupted but free, and the sequence criteria are predefined and at least one of the following sequence criteria is adjustable:

branching when a set beam evaluation criterion is fulfilled, time recording until a set beam evaluation criterion is fulfilled, acquisition of a counter reading, delete an intermediate result flag, save an intermediate result flag, logical OR operation of intermediate results, logical AND operation of intermediate results, invert intermediate results, changing a function, setting or configuration of the light curtain, read at least one input value of at least one input.

2. The light grid in accordance with claim 1, wherein the evaluation unit accepts programming via a personal computer and a graphical programming software.

3. The light grid in accordance with claim 1, wherein a function of the light grid, a setting of the light grid or a configuration of the light grid is at least one switching threshold;

one input configuration;

one output configuration;

one transmission power;

one reception sensitivity;

and/or one cycle time.

4. A method of using a light grid comprising:

a transmission unit having a plurality of light transmitters for transmitting light beams and a reception unit having a plurality of light receivers for receiving the light beams of the light transmitters, and a programmable evaluation unit that is provided in the reception unit, the transmission unit and the reception unit facing one another and disposed opposite one another; wherein a monitored field formed by oppositely disposed light transmitters and light receivers provides detection of objects, and wherein the light transmitters are activated successively in cycles and the light receivers are evaluated in these cycles;

a programmable evaluation unit provided in the receiving unit, wherein the evaluation unit evaluates the received signals of the light receivers of a cycle with reference to predetermined beam evaluation criteria and wherein an intermediate result is formed therefrom, wherein the intermediate result is stored in a memory, and discarding non-relevant information of received signals after evaluation by the evaluation unit, wherein information of received signals which do not allow evaluation by beam evaluation criteria because they do not correspond to predetermined beam evaluation criteria is discarded so that they are not stored, whereby no storage space is required, wherein the information of received signals which do not allow evaluation by beam evaluation criteria is discarded after evaluation with the beam evaluation criteria of the evaluation unit, wherein the evaluation unit evaluates at least one intermediate result in each case of a cycle using in each case at least one predetermined sequence criterion, and wherein the evaluation unit outputs at least one output signal at least one output on the basis of the evaluated intermediate result, the beam evaluation criteria being predefined and at least one of the following beam evaluation criteria being set:

a predetermined fixed light beam is interrupted, a predetermined fixed light beam is not interrupted but free, a central light beam is interrupted, a central light beam is not interrupted, but free, a first light beam is interrupted, a first light beam is not interrupted, but free, a continuously connected number of light beams is interrupted, a continuously connected number of light beams is not interrupted but free, one last light beam is interrupted, one last light beam is not interrupted, but free, a predetermined fixed number of light beams is interrupted, a predetermined fixed number of light beams is not interrupted but free, and the sequence criteria are predefined and at least one of the following sequence criteria is set:

branching when a set beam evaluation criterion is fulfilled, time recording until a set beam evaluation criterion is fulfilled, acquisition of a counter reading, delete an intermediate result flag, save an intermediate result flag, logical AND operation of intermediate results, inversion of intermediate results, changing a function, setting or configuration of the light curtain, reading in at least one input value of at least one input.

5. The method in accordance with claim 4, wherein the evaluation unit accepts programming via a personal computer and a graphical programming software.

6. The method in accordance with claim 4, wherein the setting or configuration of the light grid is at least one switching threshold;

one input configuration;

one output configuration;

one transmission power;

one reception sensitivity;

and/or one cycle time.

* * * * *